(12) United States Patent
Wagner et al.

(10) Patent No.: US 10,760,878 B2
(45) Date of Patent: Sep. 1, 2020

(54) COLORED MULTILAYERED COMPOSITE FABRICS

(71) Applicant: HONEYWELL INTERNATIONAL INC., Morris Plains, NJ (US)

(72) Inventors: Lori L. Wagner, Richmond, VA (US); Brian Duane Arvidson, Chester, VA (US); Gregory A. Davis, Midlothian, VA (US); Henry Gerard Ardiff, Chesterfield, VA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 133 days.

(21) Appl. No.: 15/679,428

(22) Filed: Aug. 17, 2017

(65) Prior Publication Data

US 2018/0066921 A1 Mar. 8, 2018

Related U.S. Application Data

(60) Provisional application No. 62/384,437, filed on Sep. 7, 2016.

(51) Int. Cl.
*B32B 3/24* (2006.01)
*F41H 3/02* (2006.01)
(Continued)

(52) U.S. Cl.
CPC .............. *F41H 3/02* (2013.01); *B32B 3/266* (2013.01); *B32B 5/022* (2013.01); *B32B 5/024* (2013.01); *B32B 5/026* (2013.01); *B32B 5/26* (2013.01); *B32B 7/02* (2013.01); *B32B 7/04* (2013.01); *B32B 7/12* (2013.01); *B32B 27/08* (2013.01);
(Continued)

(58) Field of Classification Search
CPC ..................................................... B32B 3/266
See application file for complete search history.

(56) References Cited

U.S. PATENT DOCUMENTS

| 4,681,792 A | 7/1987 | Harpell et al. |
| 4,812,140 A | 3/1989 | Russell et al. |
| (Continued) | | |

FOREIGN PATENT DOCUMENTS

| DE | 202011109331 | 1/2012 |
| EP | 962313 | 8/2006 |
| (Continued) | | |

OTHER PUBLICATIONS

International Search Report and Written Opinion for International Application No. PCT/US2017/050021.

(Continued)

*Primary Examiner* — William P Watkins, III
(74) *Attorney, Agent, or Firm* — Roberts & Roberts, LLP; Richard S. Roberts, Jr.

(57) ABSTRACT

Multilayer composite materials having a camouflaged appearance. More particularly, camouflaged tactical vest covers having slots for the webless attachment of accessories. An easily colored outer fabric is provided with a colored camouflage pattern and backed with a non-colored high tenacity fabric for enhanced durability. A colored intermediate adhesive is employed to maintain a camouflaged visual appearance without the added complexity of dying the high tenacity fibers of the backing material.

20 Claims, 3 Drawing Sheets

(51) Int. Cl.
| | |
|---|---|
| *B32B 27/30* | (2006.01) |
| *B32B 5/26* | (2006.01) |
| *B32B 5/02* | (2006.01) |
| *B32B 7/02* | (2019.01) |
| *B32B 27/36* | (2006.01) |
| *B32B 7/04* | (2019.01) |
| *B32B 27/28* | (2006.01) |
| *B32B 27/40* | (2006.01) |
| *B32B 3/26* | (2006.01) |
| *B32B 7/12* | (2006.01) |
| *B32B 27/08* | (2006.01) |
| *B32B 27/12* | (2006.01) |
| *B32B 27/32* | (2006.01) |
| *B32B 27/34* | (2006.01) |
| *F41H 1/02* | (2006.01) |

(52) U.S. Cl.
CPC ............ *B32B 27/12* (2013.01); *B32B 27/28* (2013.01); *B32B 27/30* (2013.01); *B32B 27/302* (2013.01); *B32B 27/306* (2013.01); *B32B 27/308* (2013.01); *B32B 27/32* (2013.01); *B32B 27/34* (2013.01); *B32B 27/36* (2013.01); *B32B 27/365* (2013.01); *B32B 27/40* (2013.01); *B32B 2250/04* (2013.01); *B32B 2255/02* (2013.01); *B32B 2255/26* (2013.01); *B32B 2260/021* (2013.01); *B32B 2260/046* (2013.01); *B32B 2260/048* (2013.01); *B32B 2262/02* (2013.01); *B32B 2262/0223* (2013.01); *B32B 2262/0253* (2013.01); *B32B 2262/0261* (2013.01); *B32B 2262/0269* (2013.01); *B32B 2262/0276* (2013.01); *B32B 2262/0284* (2013.01); *B32B 2262/101* (2013.01); *B32B 2262/14* (2013.01); *B32B 2264/102* (2013.01); *B32B 2264/108* (2013.01); *B32B 2270/00* (2013.01); *B32B 2307/402* (2013.01); *B32B 2307/404* (2013.01); *B32B 2307/4026* (2013.01); *B32B 2307/516* (2013.01); *B32B 2307/52* (2013.01); *B32B 2307/54* (2013.01); *B32B 2307/5825* (2013.01); *B32B 2307/72* (2013.01); *B32B 2307/748* (2013.01); *B32B 2437/00* (2013.01); *F41H 1/02* (2013.01)

(56) References Cited

U.S. PATENT DOCUMENTS

| | | | |
|---|---|---|---|
| 5,343,796 | A | 9/1994 | Cordova et al. |
| 5,466,503 | A | 11/1995 | Dischler |
| 5,476,561 | A * | 12/1995 | Bylund ............... F41H 3/02 156/268 |
| 5,887,453 | A | 3/1999 | Woods |
| 6,253,655 | B1 | 7/2001 | Lyons et al. |
| 6,794,317 | B2 | 9/2004 | Elkouh et al. |
| 7,425,359 | B2 | 9/2008 | Zafiroglu |
| 7,571,493 | B1 | 8/2009 | Purvis et al. |
| 8,236,714 | B2 | 8/2012 | Frankel |
| 2005/0255776 | A1 | 11/2005 | Howland |
| 2008/0196826 | A1 | 8/2008 | Polegato Moretti |
| 2010/0003452 | A1 | 1/2010 | Jongedijk et al. |
| 2011/0192530 | A1 | 8/2011 | Arvidson et al. |
| 2012/0186433 | A1 | 7/2012 | Braiewa et al. |
| 2013/0115393 | A1 | 5/2013 | Beck |
| 2013/0143460 | A1 | 6/2013 | Beck |
| 2014/0072758 | A1 | 3/2014 | Arvidson et al. |
| 2014/0242355 | A1 | 8/2014 | Castille |
| 2014/0272267 | A1 | 9/2014 | Grunden et al. |
| 2016/0159034 | A1 | 6/2016 | Bhatnagar et al. |
| 2016/0312399 | A1 | 10/2016 | Wagner et al. |
| 2018/0022060 | A1 | 1/2018 | Downs et al. |

FOREIGN PATENT DOCUMENTS

| | | |
|---|---|---|
| JP | 2008209069 | 9/2008 |
| JP | 2016013669 | 1/2016 |
| WO | 2012177227 | 12/2012 |

OTHER PUBLICATIONS

Wang, B., "Understanding of Strength of Materials and History of Improvement," https://www.nextbigfuture.com/2009/01/understanding-strength-of-materials-and.html, 2 pages (2009).

* cited by examiner

COLORED MULTILAYERED COMPOSITE FABRICS

CROSS-REFERENCE TO RELATED APPLICATION

This application claims the benefit of co-pending U.S. Provisional Application Ser. No. 62/384,437, filed on Sep. 7, 2016, the disclosure of which is incorporated by reference herein in its entirety.

BACKGROUND

Technical Field

The disclosure relates to multilayer composite materials having a camouflaged appearance. More particularly, the disclosure pertains to multilayer fibrous composite materials incorporating a colored component for disguising a rear or interior layer of the composite.

Description of the Related Art

Body armor products, such as bullet resistant vests, are typically provided with a cover that contains compartments or pockets into which panels of ballistic resistant materials are positioned. Soft body armor covers include woven fabrics, for example, those made from ballistic nylon, cotton and/or other fiber types. One example of a known bullet resistant vest including a vest cover is disclosed in U.S. Pat. No. 5,398,340, which provides a vest that remains in a proper protective position when worn by a moving officer.

Current outer vest covers for tactical vests are typically fabricated with abrasion resistant woven nylon fabrics, such as conventionally known CORDURA® brand nylon fabrics commercially available from Invista North America S.A R.L. of Wilmington, Del., and a Pouch Attachment Ladder System (PALS) webbing design. In a conventional PALS webbing design, rows of the heavy-duty nylon are precisely stitched onto the vest or vest cover to form a grid of attachment points to which accessories and pouches for holding accessories may be attached. Load-bearing equipment and gear incorporating the PALS webbing design are known as Modular Lightweight Load-carrying Equipment, or MOLLE, with MOLLE-compatible pouches and accessories being widely commercially available.

Although useful, the PALS/MOLLE construction adds significant weight to a vest and the three-dimensional PALS grid does not provide streamlined mobility. Accordingly, alternatives to the conventional MOLLE construction have been developed. One alternative is known as the FAV™ Advanced Webless System (AWS) commercially available from Safariland LLC of Jacksonville, Fla. This AWS, which is illustrated in FIG. 1, replaces the conventional PALS nylon webbing grid that is sewn on a vest cover with a fabric incorporating holes or slots that are cut into and completely through the fabric of the vest cover, thereby providing attachment points within the vest cover itself. See, for example, U.S. Pat. No. 7,200,871, which describes the AWS as a fabric sheet having an array of slots extending through the fabric sheet to accommodate straps for MOLLE attachments. While this AWS structure offers similar functionality to the conventional three-dimensional PALS grid, it has been recognized that the slots are not as durable as the attachment points in the PALS grid and after repeated use the fabric at the lower periphery of the slots tends to stretch and sag. This sagging reduces the integrity of the slot, making it difficult to tightly secure modular attachments to the vest, and may ultimately lead to complete tearing of the slot.

A solution to this problem has been designed by Honeywell International Inc. as described in co-pending application Ser. No. 15/081,428, which is incorporated herein by reference to the extent consistent herewith. In said disclosure, a webless attachment system having greater fabric strength and long term durability is provided that overcomes the problems of the related art. Particularly, a multilayer fibrous composite is provided that incorporates a face fabric and a base fabric attached or adjoined with the face fabric. Slots, also referred to herein as perforations, are cut into the face fabric to allow the attachment of pouches, weapons and other combat accessories, and the base fabric provides enhanced strength to prevent stretching and sagging of the composite material. In the art of tactical vest covers, it is commonplace to color at least the outermost surface of the face fabric in earth tones or in a camouflage pattern with designated color groups, including conventionally known camouflage patterns such as U.S. Woodland, Tigerstripe, and Flecktarn, among others, with colors that are useful for providing a camouflaged appearance in desert, woodland or urban environments. However, it has now been recognized that the addition of the high strength base layer behind the face fabric has the unintended consequence of compromising the camouflaged visual appearance of the vest cover because the base layer can be easily seen through the slots (perforations) cut into the face fabric. Due to the chemical and physical properties of the high strength fibers forming the base layer, colorant compositions do not bond well to the fibers and thus they cannot be easily colored, much less colored with a particular color selection or pattern. In this regard, a most preferred fiber type for forming the base layer is polyethylene, particularly fibers formed from ultra-high molecular weight polyethylene (UHMWPE). As described, for example, in U.S. Pat. No. 8,658,244 to Nguyen et al., it is quite difficult to provide yarns formed from high tenacity polyethylene fibers with color that is not easily rubbed off. In this regard, U.S. Pat. No. 8,658,244 teaches a method where individual multifilament yarns are coated with a colorant composition followed by heating and stretching the yarns while they are concurrently stretched without fusing the filaments of the multifilament yarn together. While this method could be used to effectively form a fabric with a single, uniform color, it cannot be used to color the fibers with more than one color or with a pattern of colors. Further, it adds additional processing complexity that increases the cost of manufacture. Accordingly, there is a need in the art for a more efficient method of adding color to an interior or back portion of a multilayer vest cover construction as described above to preserve the camouflaged visual appearance of the vest cover. The present disclosure provides a solution to this need.

SUMMARY OF THE DISCLOSURE

This disclosure provides multilayer composite materials having a colored face fabric that is attached to a base layer. The face fabric (outer fibrous material layer) is perforated or cut with a series of holes or slots to provide attachment points for accessories or pouches that hold accessories. The slots extend completely through the face fabric, thereby exposing the layer directly behind it, which is either the base layer having a polymeric coating thereon or an intermediate adhesive layer positioned between the outer fibrous material layer and the base layer. This coating or intermediate adhesive is colored with a colorant composition to avoid compromise of the camouflaged appearance of the face fabric, and avoiding the need to manufacture the vest cover with colored high tenacity fibers.

More particularly, provided is a multilayer composite comprising:

a) a perforated, colored outer fibrous material layer, said outer fibrous material layer comprising one or more fibrous plies; said outer fibrous material layer having at least one color;

b) a fibrous base layer adjoined with the outer fibrous material layer, said base layer comprising one or more fibrous plies, each of said fibrous plies comprising fibers having a tenacity of greater than 10 g/denier; wherein the outer fibrous material layer has a different colored appearance than the base layer; and c) a colored polymeric material between said outer fibrous material layer and said base layer; said colored polymeric material having at least one color;

wherein the colored polymeric material is partially exposed through said perforations and wherein visual exposure of the base layer through said perforations is at least partially obscured by the colored polymeric material; and wherein the portions of the colored polymeric material exposed through said perforations are camouflaged by the fibrous material layer.

Also provided is a multilayer composite comprising:

a) a perforated, colored outer fibrous material layer, said outer fibrous material layer comprising one or more fibrous plies, each of said plies comprising nylon fibers; said outer fibrous material layer being colored with a camouflage pattern; and wherein said perforations comprise a pattern of shaped openings cut into and completely through the thickness outer fibrous material layer;

b) a fibrous base layer adjoined with the outer fibrous material layer, said base layer comprising one or more fibrous plies, each of said fibrous plies comprising polyethylene fibers having a tenacity of greater than 10 g/denier; wherein the outer fibrous material layer has a different colored appearance than the base layer;

c) a colored polymeric material between and attached to each of said outer fibrous material layer and said base layer; said colored polymeric material having one color, wherein the color of the colored polymeric material is the same as one of the colors of said camouflage pattern of the outer fibrous material layer; and d) a backing layer on said fibrous base layer, wherein the backing layer comprises one or more fibrous plies, each of said fibrous plies comprising polyethylene fibers having a tenacity of greater than 10 g/denier;

wherein the colored polymeric material is partially exposed through said perforations and wherein visual exposure of the base layer through said perforations is at least partially obscured by the colored polymeric material; and wherein the portions of the colored polymeric material exposed through said perforations are camouflaged by the fibrous material layer.

Further provided is a method of forming a multilayer composite comprising:

a) providing a perforated, colored outer fibrous material layer, said outer fibrous material layer comprising one or more fibrous plies; said outer fibrous material layer having at least one color;

b) providing a colored polymeric material, wherein said colored polymeric material is colored with a color that matches at least one color of said outer fibrous material layer;

c) providing a fibrous base layer, said base layer comprising one or more fibrous plies, each of said fibrous plies comprising fibers having a tenacity of greater than 10 g/denier; wherein the outer fibrous material layer has a different colored appearance than the base layer; and d) attaching the fibrous base layer to the outer fibrous material layer coextensively wherein at least a portion of the colored polymeric material is positioned between the fibrous base layer and the outer fibrous material layer, wherein a portion of the colored polymeric material is positioned behind each of the perforations in said fibrous material layer;

wherein the colored polymeric material is partially exposed through said perforations and wherein visual exposure of the base layer through said perforations is at least partially obscured by the colored polymeric material; and wherein the portions of the colored polymeric material exposed through said perforations are camouflaged by the fibrous material layer.

DETAILED DESCRIPTION

Figure 1:
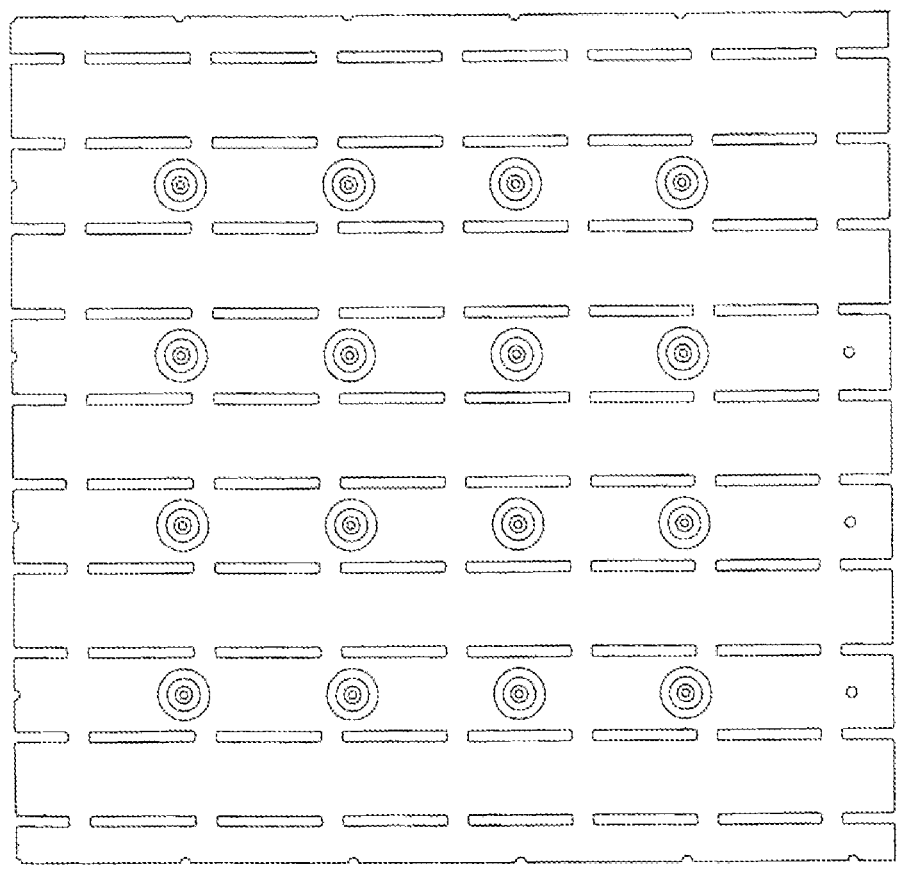
FIG. 1 is a perspective view schematic representation of the prior art FAV™ Advanced Webless System having slots cut through a face fabric as described and illustrated in U.S. Pat. No. 7,200,871.

The composites provided herein include two or more different fibrous material layers, each layer comprising one or more fibrous plies. Each of the fibrous plies of each fibrous material layer comprises a plurality of fibers, each ply optionally having a polymeric binder material on the fibers. Most broadly, an outer fibrous material layer (first fibrous material layer) having first and second surfaces and a fibrous base layer (second fibrous material layer) having first and second surfaces are bonded together such that the second surface of the outer fibrous material layer is adhesively bonded to the first surface of the base layer. In another embodiment, a backing layer (third fibrous material layer) having first and second surfaces is attached to the base layer, with the second surface of the base layer being attached to the first surface of the backing layer.

In each embodiment of the disclosure, each ply of the outer fibrous material layer is preferably fabricated with low tensile strength fibers, while each ply of the base layer and optional backing layer are fabricated with high tensile strength fibers. As used herein, a "fiber" is a long strand of a material, such as a strand of a polymeric material, the length dimension of which is much greater than the transverse dimensions of width and thickness. The fiber is preferably a long, continuous strand rather than a short segment of a strand referred to in the art as a "staple" or "staple fiber." A "strand" by its ordinary definition is a single, thin length of something, such as a thread or fiber. The cross-sections of fibers for use herein may vary widely, and they may be circular, flat or oblong in cross-section. They also may be of irregular or regular multi-lobal cross-section having one or more regular or irregular lobes projecting from the linear or longitudinal axis of the filament. Thus the term "fiber" includes filaments, ribbons, strips and the like having regular or irregular cross-section. It is preferred that the fibers have a substantially circular cross-section. A single fiber may be formed from just one filament or from multiple filaments. A fiber formed from just one filament is referred to herein as either a "single-filament" fiber or a "monofilament" fiber, and a fiber formed from a plurality of filaments is referred to herein as a "multifilament" fiber. Multifilament fibers as defined herein preferably include from 2 to about 3000 filaments, more preferably from 2 to 1000 filaments, still more preferably from 30 to 500 filaments, still more preferably from 40 to 500 filaments, still more preferably from about 40 filaments to about 240 filaments and most preferably from about 120 to about 240 filaments. Multifilament fibers are also often referred to in the art as fiber bundles or a bundle of filaments. As used herein, the term "yarn" is defined as a single strand consisting of multiple filaments and is used interchangeably with "multifilament fiber." The term "tenacity" refers to the tensile stress expressed as force (grams) per unit linear density (denier) of an unstressed specimen. The term "initial tensile modulus" refers to the ratio of the change in tenacity, expressed in grams-force per denier (g/d) to the change in strain, expressed as a fraction of the original fiber/tape length (in/in).

The term "denier" is a unit of linear density equal to the mass in grams per 9000 meters of fiber/yarn. In this regard, the fibers forming each layer may be of any suitable denier. For example, fibers may have a denier of from about 50 to about 5000 denier, more preferably from about 200 to 5000 denier, still more preferably from about 300 to about 3000 denier, and most preferably from about 350 to about 1000 denier.

A fibrous material "layer" as used herein may comprise any type of uni-axial or multi-axial fabric, including a single-ply of unidirectionally oriented or randomly oriented (e.g., felted) non-woven fibers, a plurality of plies of non-woven fibers that have been consolidated into a single unitary structure, a single-ply of woven fabric, a plurality of woven fabric plies that have been consolidated into a single unitary structure, a single-ply of knitted fabric or a plurality of knitted fabric plies that have been consolidated into a single unitary structure. In this regard, a "layer" describes a generally planar arrangement having an outer front/top (first) planar surface and an outer back/bottom (second) planar surface. The term "fibrous ply" as used herein refers to a single array of unidirectionally oriented fibers, a single woven fabric, a single knitted fabric or a single felted fabric. Each fibrous ply will also have both a first surface and a second surface and a plurality of "fibrous plies" describes more than one ply of the fibrous structures. A "single-ply" of unidirectionally oriented fibers comprises an arrangement of fibers that are aligned in a unidirectional, substantially parallel array. This type of fiber arrangement is also known in the art as a "unitape", "unidirectional tape", "UD" or "UDT." As used herein, an "array" describes an orderly arrangement of fibers or yarns, which is exclusive of woven and knitted fabrics, and a "parallel array" describes an orderly, side-by-side, coplanar parallel arrangement of fibers or yarns. The term "oriented" as used in the context of "oriented fibers" refers to the alignment direction of the fibers rather than to stretching of the fibers. The term "fabric" describes fibrous structures that may include one or more fiber plies, with or without consolidation/molding of the plies. A non-woven fabric formed from unidirectional fibers typically comprises a plurality of non-woven fiber plies that are stacked on each other surface-to-surface in a substantially coextensive fashion and consolidated. When used herein, a "single-layer" structure refers to any monolithic fibrous structure composed of one or more individual plies, wherein multiple plies have been merged by consolidation or molding techniques. The term "composite" refers to a combination of elements and may refer to combinations of fibers, combinations of fibrous plies, and combinations of fibrous layers, each optionally, but preferably, further including a polymeric binder material.

As used herein, a "high tensile strength" fiber is one which has a tenacity of at least 10 g/denier, an initial tensile modulus of at least about 150 g/denier or more, and an energy-to-break of at least about 8 J/g or more, each as measured by ASTM D2256. As used herein, a "low tensile strength fiber" is one which has a tenacity of less than 10 g/denier. Each ply of the outer fibrous material layer is formed from fibers having a lower tensile strength than the fibers forming each ply of the fibrous base layer. In preferred embodiments, each of the fibers forming each of the fibrous plies of the outer fibrous material layer are preferably fibers having a tenacity of less than 10 g/denier, more preferably from about 5 g/denier to about 10 g/denier, and most preferably have a tenacity of less than 7 g/denier, less than 6 g/denier or less than 5 g/denier. Higher or lower tenacity fibers are also useful in forming the outer fibrous material layer provided that their tenacities are lower than the fibers forming the fibrous base layer.

Suitable low tenacity fibers for forming the outer fibrous material layer within these tenacity ranges non-exclusively include nylon fibers, polyester fibers, polypropylene fibers, low tenacity polyolefin fibers, or a combination thereof. Of these fiber types, nylon fibers are most preferred. Fabrics formed from such fibers are widely commercially available. Particularly suitable for use herein are commercially available military grade nylon fabrics, also referred to in the art as mil-spec nylon fabrics. In this regard, military grade or "mil-spec" (military specification) nylon refers to fabrics that meet certain standards set by the U.S. military to be acceptable for sale to the U.S. government. Several different specifications of nylon webbing have been deemed acceptable for use by the U.S. government, including MIL-T-5038 fabric, MIL-W-4088 fabric, MIL-W-5625 fabric, MIL-W-17337 fabric, MIL-W-27065 fabric, MIL-W-43668 fabric, MIL-DTL-32439 fabric, A-A-55301 fabric, A-A-59403 fabric, A-A-549403a fabric, MIL-C-3953 fabric, MIL-C-7219 fabric, MIL-C-10799 fabric, MIL-C-12369 fabric, MIL-C-43128 fabric, MIL-C-43734 fabric, MIL-C-43734D-Class 3 fabric, MIL-C-43375 fabric and Forestry Service (5100-86) fabric, all of which are useful herein for forming one of the fabric layers. Each mil-spec sets forth specific requirements for when the materials may be used in a military garment application, such as a tactical vest/vest cover/plate carrier application, with requirements for properties such as yarn denier, fabric weave density and fabric areal density depending on the intended type of armor application. Some of them also specify a particular camouflage coloration that is deemed acceptable by the military.

One conventionally known type of mil-spec nylon fabric that is particularly useful for forming the first fibrous layer is CORDURA® brand nylon fabric which is commercially available from Invista North America S.A R.L. of Wilmington, Del. (categorized at least under military specification MIL-W-43668/A-A-55301). Such commercially available woven nylon fabrics are sometimes coated with a water repellent resin on at least one its surfaces, such as a water repellent polyurethane, but this coating is optional and is usually noted in the associated mil-spec. Whether designated as mil-spec or not, preferred nylon fabrics are available in a range of deniers and weights, ranging from low denier ripstop fabrics (approximately 30-100 denier) to high denier ballistic fabrics (approximately 400-1500 denier). Particularly preferred fibers for the outer fibrous material are nylon fibers having a denier of from 400 to 2000 denier, more preferably from about 500 to about 1500 denier, and most preferably from about 500 to about 1000 denier.

Most preferably, the outer fibrous material layer comprises a single ply of a woven nylon fabric formed from nylon fibers having a denier of from about 500 to 1000 denier, with a weave density of at least 26 fiber/yarn ends per inch×26 fiber/yarn ends per inch. Such commercially available woven nylon fabrics are typically coated with a water repellent polyurethane resin on at least one its surfaces, but this coating is optional. In a tactical vest or vest cover application, there are specific requirements for nylon fabrics that must be met and which are regulated by military standard MIL-DTL-32439, which has particular requirements for properties including yarn denier, fabric weave density and fabric areal density depending on the intended type of armor application. Accordingly, while the properties of the outer fibrous material layer may vary depending on the application, it is most preferred that the outer fibrous material layer is compliant with the MIL-DTL-32439 specifications, which would be readily accomplished by one skilled in the art.

For the purposes of this disclosure, the outer fibrous material layer is colored rather than non-colored. As used herein, "colored" is defined as non-white, wherein the non-white color is achieved by the application of at least one colorant (e.g., dye and/or pigment) or colorant composition onto the fibers. For some low tenacity fibers, the colorant may even incorporated within the fibers that form the fibrous material. As previously described, suitable low tenacity fibers for forming the outer fibrous material layer non-exclusively include nylon fibers, polyester fibers, polypropylene fibers, low tenacity polyolefin fibers, or a combination thereof, with nylon fibers being most preferred. It is well known that nylon fibers are easily colored. A nylon fabric can be colored with a single colorant, for example, by soaking the fibers in a bath of a standard aqueous dye solution or organic solvent-based dye solution. It is also well known to color nylon and other fabrics with decorative images or with patterns, such as camouflage patterns, by conventional textile printing methods wherein a colorant is bonded to the surface of a fabric. Such methods include hand block printing; perrotine printing; engraved copperplate printing; roller, cylinder, or machine printing; stencil printing; screen printing; and digital textile printing. Suitable types of colorants suitable for creating and/or applying any particular camouflage pattern or decorative image would be readily determined by one skilled in the art and non-exclusively include acid dyes, basic dyes, disperse dyes, reactive dyes, natural dyes and all-purpose dyes, such as Rit® brand dyes commercially available from Phoenix Brands LLC of Stamford, Conn. Exemplary dyes and method used for the printing of camouflage patterns on fabrics are described in detail in, for example, U.S. Pat. Nos. 6,805,957; 9,062,938 and 9,074,849, each of which is owned by the U.S. government, and each of which is incorporated by reference herein to the extent consistent herewith.

As described above, the outer fibrous material layer is further designed to include a plurality of slots (perforations) that are cut into and completely through the fabric of the vest cover to providing attachment points for accessories. As described in detail in U.S. Pat. No. 7,200,871 to Safariland LLC, which is incorporated by reference to the extent compatible herewith, and as shown in FIG. 1, the fabric includes several rows (arrays) of rotary die cut slots (perforations) that extend through the fabric sheet to accommodate straps for MOLLE removable pockets. The slots as described therein are generally rectangular and have dimensions of 1.25 inches×⅛ inch, and said slots are spaced apart by 1.5 inches horizontally and the rows are spaced apart by 1.0 inch vertically. However, these dimensions are only illustrative and not intended as strictly limiting. The slot shapes may also vary. For example, they may be cut to have a horizontal oval shape rather than a rectangular shape as shown in FIG. 1. Additionally, while it is most efficient to form the arrays of slots using a conventional rotary die cutting machine, any suitable alternative method may be used, such as steel rule die cutting or laser cutting. The number of rows of slots and the number of slots in each row may also vary as desired by the manufacturer and are not intended as strictly limiting. In one exemplary prior art tactical carrier commercially available as the TAC PR™ Advanced Webless System from Safariland LLC, a tactical carrier is fabricated having from 10 to 14 rows of slots cut into a front facing portion of the vest cover, each row having from 5 to 8 slots. In this prior art construction, the slotted carrier is fabricated with a nylon fabric only without a backing of high tenacity fibrous material as introduced in the present disclosure, but it is illustrative of a useful pattern of slots for the outer fibrous material layer of this disclosure.

As described above, while the fibers used to form the outer fibrous material layer have many desirable properties, including their ability to be easily colored, fibrous materials formed from such low tenacity fibers lack other ideal physical properties, such as long term strength and durability. For a material having the particular perforated construction of the outer fibrous material layer of the disclosure, over time the material at the lower periphery of the slots are vulnerable to stretching and sagging from the weight of the attachments (i.e., MOLLE type accessories, etc.). To overcome this problem, the outer fibrous material layer is adjoined with the fibrous base layer which is formed from high tensile strength fibers having greater tensile strength than the fibers forming the outer fibrous material layer. However, these high tensile strength fibers are generally resistant to dyes and colorization. This can be problematic because the portions of the base layer that are behind the open slots (perforations) will be exposed through them. In an application where the composite is used to form a camouflage article, the base layer cannot be easily colored to visually match or have an appearance that blends in with the colors of the outer layer. The process of this disclosure, as noted above, solves this problem by avoiding the coloration of the fibers altogether, instead incorporating a colorized polymer layer in between the low tenacity outer fibrous material layer (i.e., the face fabric) and the high tenacity fibrous base layer to camouflage, disguise or even entirely conceal the portions of the base layer that are exposed through the slots/perforations. The means for accomplishing this coloration is described in greater detail below.

With particular regard to the constriction of the base layer, each of the fibers forming each of the fibrous plies of the fibrous base layer are preferably fibers having a tenacity of greater than 10 g/denier, more preferably at least about 15 g/denier, still more preferably at least about 20 g/denier, still more preferably at least about 27 g/denier, more preferably a tenacity of from about 28 g/denier to about 60 g/denier, still more preferably from about 33 g/denier to about 60 g/denier, still more preferably 39 g/denier or more, still more preferably from at least 39 g/denier to about 60 g/denier, still more preferably 40 g/denier or more, still more preferably 43 g/denier or more, or at least 43.5 g/denier, still more preferably from about 45 g/denier to about 60 g/denier, still more preferably at least 45 g/denier, at least about 48 g/denier, at least about 50 g/denier, at least about 55 g/denier or at least about 60 g/denier.

In this regard, most or all of the fibers forming the fibrous base layer have a substantially greater tenacity than most or all of the fibers forming the outer fibrous material layer. By "most or all" it is meant that more than 50% of the fibers forming the fibrous base layer have a tenacity that is greater than the tenacity of at least 50% of the fibers forming the outer fibrous material layer. Most preferably, all of the fibers of the fibrous base layer are fibers having a tenacity greater than all of the fibers of the outer fibrous material layer. In this regard, the fibers forming each of the outer fibrous material layer and the fibrous base layer are exclusive of any fibers or threads that may be employed to stitch or sew together any of the fibrous plies or sections.

The type of fibers forming the fibrous plies of the fibrous base layer may vary depending on the desired tensile properties for each material. Particularly suitable high tenacity fibers include polyolefin fibers, such as high molecular weight polyethylene fibers, particularly ultra-high molecular weight polyethylene fibers, and polypropylene fibers. Also suitable are aramid fibers, particularly para-aramid fibers, polyamide fibers, polyethylene terephthalate fibers, polyethylene naphthalate fibers, extended chain polyvinyl alcohol fibers, extended chain polyacrylonitrile fibers, polybenzoxazole (PBO) fibers, polybenzothiazole (PBT) fibers, liquid crystal copolyester fibers, rigid rod fibers such as M5® fibers, and glass fibers, including electric grade fiberglass (E-glass; low alkali borosilicate glass with good electrical properties), structural grade fiberglass (S-glass; a high strength magnesia-alumina-silicate) and resistance grade fiberglass (R-glass; a high strength alumino silicate glass without magnesium oxide or calcium oxide). Each of these fiber types is conventionally known in the art. Also suitable for producing polymeric fibers are copolymers, block polymers and blends of the above materials.

The most preferred high tenacity fiber types are polyethylene fibers (particularly extended chain polyethylene fibers), aramid fibers, PBO fibers, liquid crystal copolyester fibers, polypropylene fibers (particularly highly oriented extended chain polypropylene fibers), polyvinyl alcohol fibers, polyacrylonitrile fibers, glass fibers and rigid rod fibers, particularly M5® rigid rod fibers. Specifically most preferred are polyethylene fibers and aramid fibers.

In the case of polyethylene, preferred fibers are extended chain polyethylenes having molecular weights of at least 300,000, preferably at least one million and more preferably between two million and five million. Such extended chain polyethylene (ECPE) fibers may be grown in solution spinning processes such as described in U.S. Pat. Nos. 4,137,394 or 4,356,138, which are incorporated herein by reference, or may be spun from a solution to form a gel structure, such as described in U.S. Pat. Nos. 4,413,110; 4,536,536; 4,551,296; 4,663,101; 5,006,390; 5,032,338; 5,578,374; 5,736,244; 5,741,451; 5,958,582; 5,972,498; 6,448,359; 6,746,975; 6,969,553; 7,078,099; 7,344,668 and U.S. patent application publication 2007/0231572, all of which are incorporated herein by reference. Particularly preferred fiber types are any of the polyethylene fibers sold under the trademark SPECTRA® from Honeywell International Inc. SPECTRA® fibers are well known in the art. Other useful polyethylene fiber types also include and DYNEEMA® UHMW PE yarns commercially available from Royal DSM N.V. Corporation of Heerlen, The Netherlands.

Particularly preferred methods for forming UHMW PE fibers are processes that are capable of producing UHMW PE fibers having tenacities of at least 39 g/denier, most preferably where the fibers are multi-filament fibers. The most preferred processes include those described in commonly-owned U.S. Pat. Nos. 7,846,363; 8,361,366; 8,444,898; 8,747,715; as well as U.S. publication no. 2011-0269359, the disclosures of which are incorporated by reference herein to the extent consistent herewith. Such processes are called "gel spinning" or "solution spinning" processes, wherein a solution of ultra-high molecular weight polyethylene and a solvent is formed, followed by extruding the solution through a multi-orifice spinneret to form solution filaments, cooling the solution filaments into gel filaments, and extracting the solvent to form dry filaments. These dry filaments are grouped into bundles which are referred to in the art as either fibers or yarns. The fibers/yarns are then stretched (drawn) up to a maximum drawing capacity to increase their tenacity.

Preferred aramid (aromatic polyamide) fibers are well known and commercially available, and are described, for example, in U.S. Pat. No. 3,671,542. For example, useful aramid filaments are produced commercially by DuPont under the trademark of KEVLAR®. Also useful herein are poly(m-phenylene isophthalamide) fibers produced commercially by DuPont of Wilmington, Del. under the trademark NOMEX® and fibers produced commercially by Teijin Aramid Gmbh of Germany under the trademark TWARON®; aramid fibers produced commercially by Kolon Industries, Inc. of Korea under the trademark HERACRON®; p-aramid fibers SVM™ and RUSAR™ which are produced commercially by Kamensk Volokno JSC of Russia and ARMOS™ p-aramid fibers produced commercially by JSC Chim Volokno of Russia.

Suitable PBO fibers are commercially available and are disclosed for example in U.S. Pat. Nos. 5,286,833, 5,296,185, 5,356,584, 5,534,205 and 6,040,050, each of which is incorporated herein by reference. Suitable liquid crystal copolyester fibers are commercially available and are disclosed, for example, in U.S. Pat. Nos. 3,975,487; 4,118,372 and 4,161,470, each of which is incorporated herein by reference, and including VECTRAN® liquid crystal copolyester fibers commercially available from Kuraray Co., Ltd. of Tokyo, Japan. Suitable polypropylene fibers include highly oriented extended chain polypropylene (ECPP) fibers as described in U.S. Pat. No. 4,413,110, which is incorporated herein by reference. Suitable polyvinyl alcohol (PV-OH) fibers are described, for example, in U.S. Pat. Nos. 4,440,711 and 4,599,267 which are incorporated herein by reference. Suitable polyacrylonitrile (PAN) fibers are disclosed, for example, in U.S. Pat. No. 4,535,027, which is incorporated herein by reference. Each of these fiber types is conventionally known and is widely commercially available. M5® fibers are formed from pyridobisimidazole-2,6-diyl (2,5-dihydroxy-p-phenylene) and were most recently manufactured by Magellan Systems International of Richmond, Va. and are described, for example, in U.S. Pat. Nos. 5,674,969, 5,939,553, 5,945,537, and 6,040,478, each of which is incorporated herein by reference. The term "rigid rod" fibers is not limited to such pyridobisimidazole-based fiber types, and many PBO and aramid fiber varieties are often referred to as rigid rod fibers. Commercially available glass fibers include S2-Glass® S-glass fibers commercially available from AGY of Aiken, S.C., HiPerTex™ E-Glass fibers, commercially available from 3B Fibreglass of Battice, Belgium, and VETROTEX® R-glass fibers from Saint-Gobain of Courbevoie, France.

To further supplement the strength of the composite, the composite may further incorporate a backing layer on the outside surface of the fibrous base layer. The backing layer is preferably a fibrous material that comprises one or more fibrous plies. Each of the fibrous plies of the backing layer may comprise low tenacity fibers, the same as or similar to those used to form the outer fibrous material layer, or high tenacity fibers, the same as or similar to those used to form the base layer. In the preferred embodiments of the disclosure, the backing layer comprises high tenacity fibers having a tenacity of greater than 10 g/denier, most preferably high tenacity polyethylene fibers. Most preferably, all of the fibers of the fibrous backing layer are fibers having a tenacity greater than all of the fibers of the outer fibrous material layer. Accordingly, both the base layer and the backing layer individually will have significantly greater ballistic penetration resistance than the outer fibrous material layer individually.

As stated previously, both the low tenacity fibers of the outer fibrous material layer and the high tenacity fibers of the base layer may be of any suitable denier, and this applies to the backing layer and any additional fibrous layers, if any, that may be adjoined to the backing layer. Preferred fiber deniers for the low tenacity fibers are stated above, with 500 denier and 1000 denier nylon fibers being most preferred. Preferred fiber deniers for the high tenacity fibers may be from about 50 to about 5000 denier, more preferably from about 200 to 5000 denier, still more preferably from about 300 to about 3000 denier, and most preferably from about 350 to about 1000 denier, with 375 denier and 400 denier polyethylene fibers or aramid fibers being most preferred.

Each of the fibrous materials of the disclosure may individually comprise any type of uni-axial or multi-axial fabric, including woven fabrics, non-woven fabrics formed from unidirectionally oriented fibers, non-woven felted fabrics formed from randomly oriented fibers, or knitted fabrics.

Woven fabrics may be formed using techniques that are well known in the art using any fabric weave, such as plain weave, crowfoot weave, basket weave, satin weave, twill weave, three dimensional woven fabrics, and any of their several variations. Plain weave is most common, where fibers are woven together in an orthogonal 0°/90° orientation with warp fibers oriented perpendicular to weft (fill) fibers, and is preferred. The warp and weft (fill) count, known in the art as a "pick count" or "mesh count," is a measure of the density of the woven fabric. Plain weave fabrics may have an equal or unequal warp and weft count. In this regard, a preferred outer fibrous material layer is one having a pick count of from about 20 ends per inch to about 80 ends per inch in each of the warp and weft directions, more preferably from about 25 ends per inch to about 70 ends per inch in each of the warp and weft directions, and most preferably from about 25 ends per inch to about 60 ends per inch in each of the warp and weft directions. A preferred fibrous base layer is one having a pick count of from about 15 ends per inch to about 70 ends per inch in each of the warp and weft directions, more preferably from about 20 ends per inch to about 60 ends per inch in each of the warp and weft directions, still more preferably from about 20 ends per inch to about 50 ends per inch in each of the warp and weft directions, and most preferably from about 25 ends per inch to about 40 ends per inch in each of the warp and weft directions.

Knit fabric structures are constructions composed of intermeshing loops, with the four major types being tricot, raschel, net and oriented structures. Due to the nature of the loop structure, knits of the first three categories are not as suitable as they do not take full advantage of the strength of a fiber. Oriented knitted structures, however, use straight inlaid yarns held in place by fine denier knitted stitches. The fibers are very straight without the crimp effect found in woven fabrics due to the interlacing effect on the yarns. These laid in yarns can be oriented in a monoaxial, biaxial or multi-axial direction depending on the engineered requirements. It is preferred that the specific knit equipment used in laying in the load bearing yarns is such that the yarns are not pierced through.

Non-woven unidirectional fibrous ply constructions are also conventional in the art and methods of their fabrication are also conventional. Such conventional methods may be employed to fabricate all or any of the fibrous plies of the disclosure that are desired to have a non-woven unidirectional construction. For example, in a preferred method of forming a non-woven unidirectional fibrous ply, a plurality of fibers are arranged into an array, typically being arranged as a fiber web comprising a plurality of fibers aligned in a substantially parallel, unidirectional array. In a typical process, fiber bundles are supplied from a creel and led through guides and one or more spreader bars into a collimating comb. This is typically followed by coating the fibers with a polymeric binder material. A typical fiber bundle will have from about 30 to about 2000 individual fibers. The spreader bars and collimating comb disperse and spread out the bundled fibers, reorganizing them side-by-side in a coplanar fashion. Ideal fiber spreading results in the individual filaments or individual fibers being positioned next to one another in a single fiber plane, forming a substantially unidirectional, parallel array of fibers without fibers overlapping each other.

Felts may also be formed by one of several techniques known in the art. A felt is a non-woven network of randomly oriented fibers, preferably at least one of which is a discontinuous fiber, preferably a staple fiber having a length ranging from about 0.25 inch (0.64 cm) to about 10 inches (25.4 cm). Conventional methods include carding, fluid laying, melt blowing and spin laying.

The outer fibrous material layer, fibrous base layer, optional backing layer, and any other optional fibrous layer may each may be the same or different in fabric structure relative to each other. Preferably, the composite articles are formed by a combination of different types of fabrics forming a hybrid structure. For example, in one preferred embodiment, the base layer comprises a plurality of (consolidated) unidirectional non-woven fibrous plies, and a backing layer is included that comprises a plurality of (consolidated) woven fibrous plies. In another exemplary embodiment, all of the fibrous plies of both the base layer and an included backing layer are non-woven. In yet another preferred embodiment, all of the fibrous plies of the base layer are woven plies and all of the fibrous plies of an included backing layer are unidirectional non-woven plies. However, in every embodiment, it is most preferred that all fibrous plies forming the outer fibrous material layer (face fabric) are woven.

In yet another embodiment, the base layer and/or the optional backing layer is a woven fabric formed with compressed fibers that have been transformed into fibrous tapes as described in, for example, commonly-owned U.S. Pat. Nos. 8,263,119; 8,697,220; 8,685,519; 8,852,714; 8,906,485; 9,138,961 and 9,291,440, each of which is incorporated herein by reference to the extent consistent herewith. U.S. Pat. Nos. 9,138,961 and 9,291,440 also disclose non-fibrous tapes that may be useful herein as substitutes for the multi-filament fibers of one or more of the fibrous plies described herein. In this regard, the term "tape" refers to a flat, narrow, monolithic strip of material having a length greater than its width and an average cross-sectional aspect ratio, i.e. the ratio of the greatest to the smallest dimension of cross-sections averaged over the length of the tape article, of at least about 3:1. A fibrous tape is a tape that comprises one or more filaments, and a non-fibrous tape is a tape that is not formed from filaments but is formed from strips of polymer, for example, strips of polymer formed by slicing a polymer film. Like fibers, the tapes may be of any suitable denier, preferably having a denier of from about 50 to about 30,000, more preferably from about 200 to 10,000 denier, still more preferably from about 650 to about 2000 denier, and most preferably from about 800 to about 1500 denier.

A plurality of fabric plies may be merged together according to conventional methods in the art to form each individual fabric layer prior to coupling pairs of fabric layers. In this regard, a plurality of single plies of the selected fabric ply type are stacked on top of each other in coextensive fashion and merged, i.e. consolidated, together. Each fabric layer preferably includes from about 1 to about 100 fabric plies, more preferably from about 2 to about 85 fabric plies, and most preferably from about 2 to about 65 fabric plies. When a section comprises a plurality of unidirectional non-woven fibrous plies, it is typical for a plurality of such plies to first be formed into a 2-ply or 4-ply unidirectional non-woven fiber "pre-preg" or "pre-preg layer," prior to combining a plurality of such "pre-pregs" or "pre-preg layers" together to form the section. Each pre-preg typically includes from 2 to about 6 fibrous plies, typically being cross-plied at 0°/90°, but may include as many as about 10 to about 20 fibrous plies as may be desired for various applications, with each pre-preg also preferably being cross-plied relative to other pre-pregs at alternating 0°/90° orientations. When a section comprises such non-woven unidirectional fiber "pre-pregs," the section preferably comprises from 2 to about 100 pre-pregs, more preferably from about 2 to about 85 pre-pregs, and most preferably from about 2 to about 65 pre-pregs, each of which preferably comprises two unidirectional plies. The plies forming each pre-preg are typically merged together with a polymeric binder, as discussed in greater detail below.

With particular regard to fibrous layers comprising a plurality of unidirectional non-woven fibrous plies, it is conventionally known in the art to coextensively stack individual fibrous plies upon each other such that the unidirectionally oriented fibers in each fibrous ply are oriented in a non-parallel longitudinal fiber direction relative to the longitudinal fiber direction of each adjacent ply. Most typically, the fibrous plies are cross-plied orthogonally at 0° and 90° angles wherein the angle of the fibers in even numbered layers is preferably substantially the same and the angle of the fibers in odd numbered layers is preferably substantially the same, but adjacent plies can be aligned at virtually any angle between about 0° and about 90° with respect to the longitudinal fiber direction of another ply. For example, a five ply non-woven structure may have plies oriented at a 0°/45°/90°/45°/0° or at other angles. Such rotated unidirectional alignments are described, for example, in U.S. Pat. Nos. 4,457,985; 4,748,064; 4,916,000; 4,403,012; 4,623,574; and 4,737,402, all of which are incorporated herein by reference to the extent not incompatible herewith. With particular regard to fibrous materials comprising one or more woven fibrous plies, it is also typical for the warp and weft component fibers forming a single fibrous material to be oriented orthogonally to each other.

The total number of fibrous plies in each of the outer fibrous material layer, the fibrous base layer, the optional backing layer, and any additional fibrous materials may be different or may be the same, wherein the layers are of any suitable thickness. Additionally, the individual plies of each individual section may also remain unconsolidated prior to a single consolidation or molding (i.e., high pressure consolidation) step to combine multiple unconsolidated composite sections together in a single step, or alternatively, each section may be pre-consolidated prior to consolidating the sections collectively into a unitary article.

The fibers forming each fibrous layer of the disclosure are preferably, but not necessarily, at least partially coated with a polymeric binder material. The polymeric binder material is also commonly referred to in the art as a polymeric "matrix" material. These terms are conventionally known in the art and describe a material that binds fibers together, either by way of its inherent adhesive characteristics or after being subjected to well known heat and/or pressure conditions. As used herein, a "polymeric" binder or matrix material includes resins and rubber. When present, the polymeric binder/matrix material either partially or substantially coats the individual fibers, preferably substantially coating each of the individual filaments/fibers forming a fiber ply or fiber layer, or fully encapsulating each of the individual filaments/fibers forming a fiber ply or fiber layer.

As noted above, in accordance with the objectives of this disclosure, the visual appearance of the overall multilayer composite of the disclosure will be affected by the difference in color of the base fabric as compared to the color of the outer fibrous material layer. The outer fibrous material layer is intended to be colored with one or more colorants that give it a colored, visual appearance that blends in with particular surrounding environments. However, the fibrous base layer is not colored and will have a different colored appearance (the natural color of the fibers, typically white or yellow) than the outer fibrous material layer, which would be exposed through the cut out openings (slots/perforations) in the outer fibrous material layer, causing it to visually stand out, and potentially making a user more recognizable. This is overcome by incorporating a colored polymeric material within the composite construction between said outer fibrous material layer and said base layer having a color that blends in with at least one color of the outer fibrous material layer. This colored polymeric material is then exposed through said perforations rather than the base layer itself, and thus visual exposure of the base layer through said perforations is at least partially obscured by the colored polymeric material. As defined herein, to "obscure" means to conceal or to keep from being seen. More particularly, the colored polymeric material is provided with one or more colors such that the portions of the colored polymeric material that are exposed through the perforations in the outer fibrous material layer are camouflaged by the fibrous material layer. In this regard, the camouflaging of the portions of the colored polymeric material that are exposed through the perforations means that the color of the colored polymeric material will not stand out in comparison to the color of the outer fibrous material layer. It will be a color that most preferably disguises or even entirely conceals the portions of the base layer that would otherwise be exposed through the slots/perforations.

In order to accomplish this objective, it is desired that the color of the colored polymeric material is either identical to, similar to or analogous to at least one of the colors of the outer fibrous material layer. In this regard, a well-known method for identifying colors is the Munsell color system, and a standard method for valuation of a particular color under the Munsell system is set forth in ASTM D1535. The Munsell Color System, named for its creator Albert H. Munsell, is a three dimensional color space that specifies colors based on three attributes: hue, value (lightness) and chroma (color purity, strength). It has been revised from its original specifications by the Colorimetric Committee of the Optical Society of America, and with these changes it is often referred to today as the "Renotation Munsell" system, but the terms "Munsell" and "Renotation Munsell" are used interchangeably herein.

Figure 2:
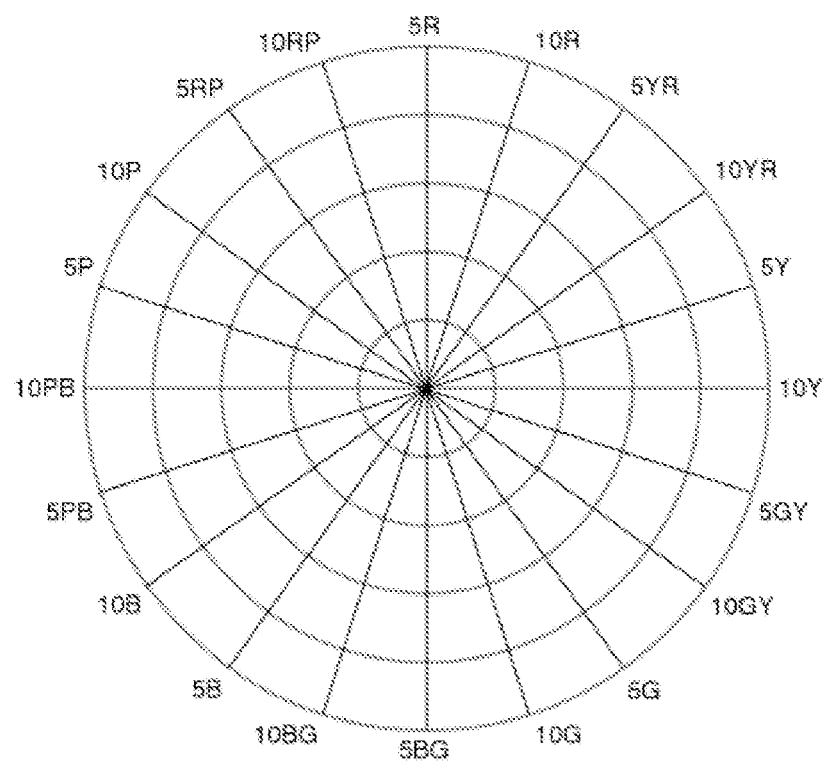
FIG. 2 is an illustration of the Munsell hue scale.

In this regard, the "Munsell hue" of the color means the attribute of color which can be found in the spectrum of light. In this color system, red (R), yellow (Y), green (G), blue (B), and purple (P) are selected as five principle hue sectors; and yellow-red (YR), green-yellow (GY), blue-green (BG), purple-blue (PB), and red-purple (RP) are arranged therebetween as five intermediate hue sectors. As illustrated in FIG. 2, which illustrates the configuration of the Munsell hue scale, the hues are arranged in the following order, beginning with red (R):

R-YR-Y-GY-G-BG-B-PB-P-RP

As seen in FIG. 2, after RP the scale returns to R. Each of these ten hue sectors has 10 integral divisions ("degrees" or "steps" of hue) and thus when shown will be prefixed by a number from 1 to 10. In this regard, a degree of 5 is considered the primary color of the hue (e.g., 5R is primary red, 5YR is primary yellow-red, 5Y is primary yellow, etc.) because they are the midpoints of the sectors. Thus there are 100 different hues on the Munsell hue scale.

The "Munsell value" indicates how light or dark a color is, also with a range of 0 to 10. In this color system, black has a Munsell Value of 0 and white has a Munsell Value of 10. The "Munsell chroma" means sharpness or intensity of color. In the Munsell color system, achromatic color (grey) has a chroma of 0 (also identified with the letter N for neutral) and increases as a color becomes more saturated than a grey of the same Munsell hue and value. There is no intrinsic upper limit to chroma. Its value increases as the color sharpness increases, and upper limits for a particular color are dependent on Munsell hue and value.

As noted above, in order for the colored polymeric material to at least partially obscure the visual exposure of the base layer, while also disguising the portions of the colored polymeric material that are exposed through the slots/perforations in the base layer so that they are camouflaged by the fibrous material layer, it has been determined that the color of the colored polymeric material should have a Munsell hue that is identical to, similar to, or at least analogous to the Munsell hue of at least one color of said colored outer fibrous material layer. In this regard, for the purposes of this disclosure, an "analogous" Munsell hue means a hue within ±5 steps/degrees on the Munsell hue scale, and a "similar" Munsell hue means a hue within ±2.5 steps/degrees on the Munsell hue scale. For example, an analogous color with respect to 5B is in the range of 10B to 10BG (see FIG. 2 for clarity), and a "similar" color with respect to 5YR is in the range of 2.5YR to 7.5YR.

Accordingly, the actual color or colors of the outer fibrous material layer may vary widely depending on the environment in which it is intended to appear camouflaged, and the color of the colored polymeric material is not particularly important as long as it has a hue that is within 10 steps of the hue of at least one color of the outer fibrous material layer as per the Munsell hue scale. With regard to the Munsell value and Munsell chroma, it is also preferred that the colored polymeric material has a color that is compatible with the outer fibrous material layer. As noted above, the Munsell value scale ranges from 0 (black) to 10 (white), and it is preferred, but not required, that the color of the colored polymeric material has a Munsell value within 2.5 of the Munsell value of at least one of the colors of the outer fibrous material layer. It is also preferred, but not required, that the color of the colored polymeric material has a Munsell chroma within 2.5 of the Munsell chroma of at least one of the colors of the outer fibrous material layer.

The colored polymeric material may be incorporated within the composite construction in any suitable form whereby it is positioned between said outer fibrous material layer and said base layer to position color behind at least the portions of the outer fibrous material layer that have been removed, i.e., behind the slots/perforations. In one preferred embodiment, the colored polymeric material is in the form of a colored polymeric film.

Preferred polymer films non-exclusively include thermoplastic polymer layers including polyolefins, polyamides, polyesters (particularly polyethylene terephthalate (PET) and PET copolymers), polyurethanes, vinyl polymers, ethylene vinyl alcohol copolymers, ethylene octane copolymers, acrylonitrile copolymers, acrylic polymers, vinyl polymers, polycarbonates, polystyrenes, fluoropolymers and the like, as well as co-polymers and mixtures thereof, including ethylene vinyl acetate (EVA) and ethylene acrylic acid. Of these, polyolefin and polyamide layers are preferred. The preferred polyolefin is a polyethylene. Non-limiting examples of useful polyethylenes are low density polyethylene (LDPE), linear low density polyethylene (LLDPE), medium density polyethylene (MDPE), linear medium density polyethylene (LMDPE), linear very-low density polyethylene (VLDPE), linear ultra-low density polyethylene (ULDPE), high density polyethylene (HDPE) and co-polymers and mixtures thereof.

Particularly preferred are adhesive films comprising, for example, elastomeric materials such as polyethylene adhesives, including cross-linked polyethylene and chlorosulfonated polyethylene, ethylene copolymers, polypropylene, propylene copolymers, polybutadiene, polyisoprene, natural rubber, ethylene-propylene copolymers, ethylene-propylene-diene terpolymers, polysulfide polymers, polyurethane elastomers, polychloroprene, plasticized polyvinylchloride using one or more plasticizers that are well known in the art (such as dioctyl phthalate), butadiene acrylonitrile elastomers, poly (isobutylene-co-isoprene), polyacrylates, polyesters, unsaturated polyesters, polyethers, fluoroelastomers, silicone elastomers, copolymers of ethylene, thermoplastic elastomers, phenolics, polybutyrals, epoxy polymers, styrenic block copolymers, such as styrene-isoprene-styrene or styrene-butadiene-styrene types, and other suitable polymers that are conventionally known in the art. The colored polymeric material may also comprise one or more colored adhesives such as methacrylate adhesives, cyanoacrylate adhesives, UV cure adhesives, urethane adhesives, epoxy adhesives and blends of the above materials. Such adhesives may be applied, for example, in the form of a hot melt, film, paste or spray, or as a two-component liquid adhesive.

Of these polymers listed above, a film comprising a thermoplastic polyurethane adhesive is preferred, as well as a film comprising a blend of one or more polyurethane thermoplastics with one or more other thermoplastic polymers.

Such polymer layers may be fabricated and bonded to the surface of the outer fibrous material layer and/or the fibrous base layer using well known techniques, such as conventional extrusion and thermal lamination techniques. In this regard, the polymer layer may be applied either before, during or after the merging together the individual fiber plies of each individual section or before, during or after the merging together of all the collective layers/sections into a unitary composite. Typically, laminating is done by positioning the individual layers on one another under conditions of sufficient heat and pressure to cause the layers to combine into a unitary structure. Lamination may be conducted at temperatures ranging from about 95° C. to about 175° C., preferably from about 105° C. to about 175° C., at pressures ranging from about 5 psig (0.034 MPa) to about 100 psig (0.69 MPa), for from about 5 seconds to about 36 hours, preferably from about 30 seconds to about 24 hours. Such polymer layers may also optionally be bonded to the composite surfaces with hot glue or hot melt fibers as would be understood by one skilled in the art. Such polymer films are preferably very thin, having preferred layer thicknesses of from about 1 μm to about 250 82 m, more preferably from about 5 μm to about 25 μm and most preferably from about 5 μm to about 9 μm. While such thicknesses are preferred, it is to be understood that other thicknesses may be produced to satisfy a particular need and yet fall within the scope of the present invention.

Alternatively, rather than incorporating a discrete polymer film into the composite construction, the fibrous base layer may comprise a fibrous material that incorporates a polymeric binder or matrix material, wherein a suitable colorant is added to the binder/matrix composition. Suitable polymeric binder materials include both low tensile modulus, elastomeric materials and high tensile modulus materials. As used herein throughout, the term tensile modulus means the modulus of elasticity, which for polymeric binder materials is measured by ASTM D638. A low or high modulus binder may comprise a variety of polymeric and non-polymeric materials. For the purposes of this invention, a low modulus elastomeric material has a tensile modulus measured at about 6,000 psi (41.4 MPa) or less according to ASTM D638 testing procedures. A low modulus polymer is preferably an elastomer having a tensile modulus of about 4,000 psi (27.6 MPa) or less, more preferably about 2400 psi (16.5 MPa) or less, still more preferably 1200 psi (8.23 MPa) or less, and most preferably is about 500 psi (3.45 MPa) or less. The glass transition temperature (Tg) of the low modulus elastomeric material is preferably less than about 0° C., more preferably the less than about −40° C., and most preferably less than about −50° C. The low modulus elastomeric material also has a preferred elongation to break of at least about 50%, more preferably at least about 100% and most preferably at least about 300%. Whether a low modulus material or a high modulus material, in addition to the colorant, the polymeric binder may also include fillers such as carbon black or silica, may be extended with oils, or may be vulcanized by sulfur, peroxide, metal oxide or radiation cure systems as is well known in the art.

A wide variety of materials and formulations may be utilized as a low modulus polymeric binder. Representative examples include polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride, butadiene acrylonitrile elastomers, poly(isobutylene-co-isoprene), polyacrylates, polyesters, polyethers, fluoroelastomers, silicone elastomers, copolymers of ethylene, polyamides (useful with some fiber types), acrylonitrile butadiene styrene, polycarbonates, and combinations thereof, as well as other low modulus polymers and copolymers curable below the melting point of the fiber. Also useful are blends of different elastomeric materials, or blends of elastomeric materials with one or more thermoplastics.

Particularly useful are block copolymers of conjugated dienes and vinyl aromatic monomers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type $(AB)_n$ (n=2–10) or radial configuration copolymers of the type $R-(BA)_x$ (x=3–150); wherein A is a block from a polyvinyl aromatic monomer and B is a block from a conjugated diene elastomer. Many of these polymers are produced commercially by Kraton Polymers of Houston, Tex., including low modulus polystyrene-polyisoprene-polystyrene block copolymers sold under their trademark KRATON®. Also useful are resin dispersions of styrene-isoprene-styrene (SIS) block copolymer sold under the trademark PRINLIN® and commercially available from Henkel Technologies, based in Düsseldorf, Germany.

High modulus, rigid materials generally have an initial tensile modulus greater than 6,000 psi. Useful high modulus, rigid polymeric binder materials include polyurethanes (both ether and ester based), epoxies, polyacrylates, phenolic/polyvinyl butyral (PVB) polymers, vinyl ester polymers, styrene-butadiene block copolymers, as well as mixtures of polymers such as vinyl ester and diallyl phthalate or phenol formaldehyde and polyvinyl butyral. Also useful is a thermosetting polymer that is soluble in carbon-carbon saturated solvents such as methyl ethyl ketone, and possessing a high tensile modulus when cured of at least about $1 \times 10^6$ psi (6895 MPa) as measured by ASTM D638. Also useful are the binder materials described in U.S. Pat. No. 6,642,159, the disclosure of which is incorporated herein by reference. However, low modulus binder materials are preferred over high modulus binder materials.

Most specifically preferred binder polymers are polar resins or polar polymers, particularly polyurethanes within the range of both soft and rigid materials at a tensile modulus ranging from about 2,000 psi (13.79 MPa) to about 8,000 psi (55.16 MPa). Preferred polyurethanes are applied as aqueous polyurethane dispersions that are most preferably, but not necessarily, cosolvent free. Such includes aqueous anionic polyurethane dispersions, aqueous cationic polyurethane dispersions and aqueous nonionic polyurethane dispersions. Particularly preferred are aqueous anionic polyurethane dispersions; aqueous aliphatic polyurethane dispersions, and most preferred are aqueous anionic, aliphatic polyurethane dispersions, all of which are preferably cosolvent free dispersions. Such includes aqueous anionic polyester-based polyurethane dispersions; aqueous aliphatic polyester-based polyurethane dispersions; and aqueous anionic, aliphatic polyester-based polyurethane dispersions, all of which are preferably cosolvent free dispersions. Such also includes aqueous anionic polyether polyurethane dispersions; aqueous aliphatic polyether-based polyurethane dispersions; and aqueous anionic, aliphatic polyether-based polyurethane dispersions, all of which are preferably cosolvent free dispersions. Similarly preferred are all corresponding variations (polyester-based; aliphatic polyester-based;

polyether-based; aliphatic polyether-based, etc.) of aqueous cationic and aqueous nonionic dispersions. Most preferred is an aliphatic polyurethane dispersion having a modulus at 100% elongation of about 700 psi or more, with a particularly preferred range of 700 psi to about 3000 psi. More preferred are aliphatic polyurethane dispersions having a modulus at 100% elongation of about 1000 psi or more, and still more preferably about 1100 psi or more. Most preferred is an aliphatic, polyether-based anionic polyurethane dispersion having a modulus of 1000 psi or more, preferably 1100 psi or more.

When a fibrous layer of the disclosure does include a binder, the total weight of the binder comprising the particular fibrous layer preferably comprises from about 2% to about 50% by weight, more preferably from about 5% to about 30%, more preferably from about 7% to about 20%, and most preferably from about 14% to about 20% by weight of the fibers plus the weight of the binder. A lower binder content is appropriate for woven and knitted fibrous layers, wherein a polymeric binder content of greater than zero but less than 10% by weight of the fibers plus the weight of the binder is typically most preferred, but this is not intended as strictly limiting. For example, phenolic/PVB impregnated woven aramid fabrics are sometimes fabricated with a higher resin content of from about 20% to about 30%, although about 12% content is typically preferred. In this regard, weaving or knitting of fabrics is typically performed prior to coating the fibers of a woven fabric with a polymeric binder, wherein the fabrics are thereafter impregnated with the binder.

Any desirable color can be achieved with the appropriate selection of colorant and binder polymer, and wherein coloration of the polymer may be achieved simply by combining a coloring agent with the binder polymer or polymer solution. Examples of suitable colorants include dyes and pigments, both aqueous and organic, as would be determined by one skilled in the art. Suitable dyes non-exclusively include those dyes listed above, i.e., acid dyes, basic dyes, disperse dyes, reactive dyes, natural dyes and all-purpose dyes, such as Rit® brand dyes commercially available from Phoenix Brands LLC of Stamford, Conn. A particular example of a useful colorant is copper phthalocyanine, and the like. Any conventionally known method may be used to blend the colorant into the polymer, and typically the amount of colorant (e.g., dye or pigment) added to the polymeric material will range from about 0.5 to about 20 weight percent, more preferably from about 2 to about 15 weight percent, and most preferably from about 4 to about 10 weight percent by weight of the polymeric material.

Methods for applying a colored polymeric binder material to fibers to thereby impregnate fibrous materials (i.e., fibrous material plies/layers) with the binder are well known and readily determined by one skilled in the art. The term "impregnated" is considered herein as being synonymous with "embedded," "coated," or otherwise applied with a polymeric coating where the polymeric material diffuses into the fiber ply/layer and is not simply on a surface of the ply/layer. Any appropriate application method may be utilized to apply the polymeric binder material and particular use of a term such as "coated" is not intended to limit the method by which it is applied onto the filaments/fibers. Useful methods include, for example, spraying, extruding or roll coating polymers or polymer solutions onto the fibers, as well as transporting the fibers through a molten polymer or polymer solution. Most preferred are methods that substantially coat or encapsulate each of the individual fibers and cover all or substantially all of the fiber surface area with the polymeric binder material.

Regardless of the method used to join the plies of each individual section to each other, all of the sections of the composite article, are to be bonded together under pressure, i.e. by low pressure consolidation/lamination or by high pressure molding, with an intermediate adhesive or by employing an existing polymeric binder coating as an adhesive to aid in bonding the different sections together, wherein a consolidated, unitary composite article is formed. This specifically excludes stitching as a sole means of attaching the different sections together. It has been found that bonding the sections together by adhesive molding or adhesive consolidation will increase inter-laminar strength between the different sections, which translates to greater peel strength between the individual material layers, higher stiffness of the consolidated composite, and greater tear resistance of the consolidated composite.

When forming the individual material layer sections, and also when forming a consolidated composite article of the disclosure that combines all of the fibrous material layers into a single unitary composite article, all the plies and/or material layers are overlapped on top of each other to form a stack followed by consolidating the plurality of plies and/or plurality of layers together at once. Merging of the plies/layers into single-layer composite structures may be accomplished using conventional techniques in the art, which as noted above includes both low pressure consolidation techniques and high pressure molding techniques, with or without heat.

In the preferred embodiments, each stack of overlapping non-woven fiber plies (unidirectional or felted), woven fabric plies, knitted fabric plies or a combination thereof is merged under heat and pressure, or by adhering the coatings of individual fibrous plies to each other, to thereby form a single-layer, monolithic element. Methods of consolidating fibrous plies/layers are well known, such as by the methods described in U.S. Pat. No. 6,642,159. Although consolidation can occur without pressure via drying, cooling, heating or a combination thereof, pressurized consolidation is preferred for optimum bonding of the layers. In this regard, consolidation may be performed at temperatures ranging from about 50° C. to about 175° C., preferably from about 105° C. to about 175° C., and at pressures ranging from about 5 psig (0.034 MPa) to about 2500 psig (17 MPa), for from about 0.01 seconds to about 24 hours, preferably from about 0.02 seconds to about 2 hours. When heating, it is possible that a present polymeric binder coating can be caused to stick or flow without completely melting. Generally, if the polymeric binder material is caused to melt, relatively little pressure is required to form the composite, while if the binder material is only heated to a sticking point more pressure is typically required. As is conventionally known in the art, consolidation may be conducted in a calender set, a flat-bed laminator, a press or in an autoclave. Consolidation may also be conducted by vacuum molding the material in a mold that is placed under a vacuum. Vacuum molding technology is well known in the art. Most commonly, a plurality of orthogonal fiber webs are "glued" together with the binder polymer and run through a flat-bed laminator to improve the uniformity and strength of the bond.

High pressure merging of the fibrous plies may be achieved by molding under heat and pressure in a suitable molding apparatus at a pressure of from about 50 psi (344.7 kPa) to about 5,000 psi (34,470 kPa), more preferably about 100 psi (689.5 kPa) to about 3,000 psi (20,680 kPa), most preferably from about 150 psi (1,034 kPa) to about 1,500 psi (10,340 kPa). Molding may alternately be conducted at higher pressures of from about 5,000 psi (34,470 kPa) to about 15,000 psi (103,410 kPa), more preferably from about 750 psi (5,171 kPa) to about 5,000 psi, and more preferably from about 1,000 psi to about 5,000 psi. The molding step may take from about 4 seconds to about 45 minutes. Preferred molding temperatures range from about 200° F. (~93° C.) to about 350° F. (~177° C.), more preferably at a temperature from about 200° F. to about 300° F. and most preferably at a temperature from about 200° F. to about 280° F. The pressure under which the fibrous plies are molded has a direct effect on the stiffness or flexibility of the resulting molded product. Particularly, the higher the pressure at which they are molded, the higher the stiffness, and vice-versa. In addition to the molding pressure, the quantity, thickness and composition of the fibrous plies and polymeric binder coating type also directly affects the stiffness of composite.

While each of the molding and consolidation techniques described herein are similar and the terms are often used interchangeably in the art, "molding" as used herein specifically refers to a method of merging by bonding fibrous plies/layers together in a batch process, while "consolidation" refers to a method of merging by bonding fibrous plies/layers together in a generally continuous process. Further, molding typically involves the use of a mold, such as a shaped mold or a match-die mold when forming a flat panel, and does not necessarily result in a planar product. Normally consolidation is done in a flat-bed laminator, in a double belt or steel belt press, in a calendar nip set or by wet lamination to produce soft (flexible) body armor fabrics. In addition, molding is typically performed under relatively high pressure, while consolidation is typically performed under relatively low pressure, as discussed above. However, this is not intended to be strictly limiting and molding procedures, such as vacuum molding or autoclave molding, are often performed at relatively low pressures as determined by one skilled in the art. In either process, suitable temperatures, pressures and times are generally dependent on the type of polymeric binder coating materials, polymeric binder content, process used and fiber type.

Upon consolidation of the outer fibrous material layer and the fibrous base layer, with or without the optional backing layer, a composite is achieved having a slit tear resistance of greater than about 300 lbs, preferably greater than about 400 lbs, more preferably at least about 500 lbs. or more, and most preferably at least about 600 lbs or more as determined by the MIL-C-21189 slit tear testing method. Particularly, the slit tear strength of the consolidated composite of the disclosure is greater than the slit tear strength of the outer fibrous material layer alone. The consolidated composite also exhibits peel strength between the outer fibrous material layer and the fibrous base layer of at least 2 lbs/inch.

Figure 3:
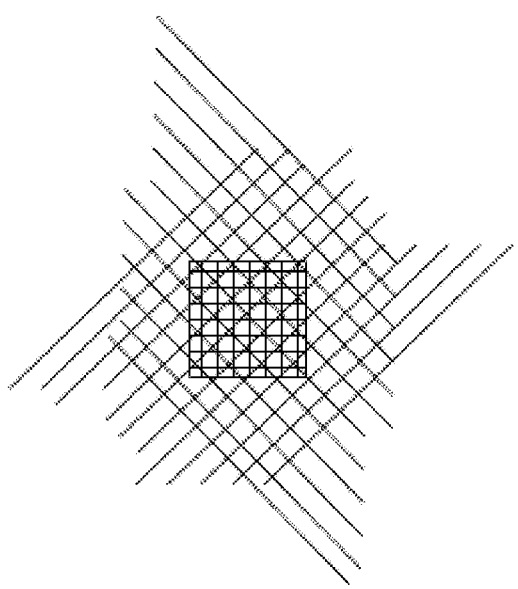
FIG. 3 is a perspective view schematic representation of an outer fibrous material layer positioned on a fibrous base layer, each layer being formed with orthogonal fibers and with the fibers of one layer being positioned at −45°/+45° relative to the fibers of the other layer.

When forming the composites of the disclosure into a vest or vest cover article, the outer fibrous material layer is positioned as the outside facing surface against which modular attachments will be positioned. In this regard, it has been unexpectedly discovered that when merging the outer fibrous material layer with the base layer, the dimensional stability of the consolidated combination of the two layers is significantly improved when the fibers of the outer fibrous material layer are oriented at +45° and −45° to the fibers of the base layer. This may be accomplished by cutting sections on a bias from a larger 0°/90° fabric, or by physically orienting a 0°/90° fabric at +45°/−45° angles relative to the other fabric when positioning the layers together prior to consolidation. A schematic example of this preferred fiber orientation is illustrated in FIG. 3 (not drawn to scale; colored polymeric material not shown). This fiber layer configuration is particularly desirable when the composites of the disclosure are employed in the fabrication of ballistic resistant vests or vest covers having a webless construction as discussed above. By combining the low tenacity outer fabric with a high tenacity base fabric, and orienting the layers so that the fibers of the high tenacity base fibrous material layer are at +45°/−45° angles relative to 0°/90° fibers of the outer fibrous material layer, the durability of the slots (see FIG. 1) is improved and the tendency of the fabric at the lower periphery of the slots to stretch and sag is substantially reduced.

In the most preferred embodiments of the disclosure, a vest cover article is formed from a composite that comprises, consists essentially of or consists of a first woven nylon fibrous material layer (i.e., the outer fibrous material layer) that is directly or indirectly bonded to a fibrous base layer that comprises a non-woven fabric formed from a plurality of unidirectional plies of polyethylene fibers or aramid fibers coated/impregnated with a colored polymeric binder material, which base layer is bonded to a backing layer that comprises a single ply of woven fabric or a plurality of unidirectional plies of polyethylene fibers or aramid fibers, and further including an additional polymer film selected from any of the materials listed above adhered to the outermost surface of the backing layer. In this regard, the polymer film on the outermost surface of the backing layer constitutes the innermost layer of the vest cover article.

In order to further improve the durability of the composites of the disclosure, without forming an article having excessive weight, it is also preferred that the each fibrous material section of the disclosure has an areal density of about 400 g/m$^2$ or less, more preferably about 300 g/m$^2$ or less, still more preferably about 200 g/m$^2$ or less, still more preferably about 150 g/m$^2$ or less, still more preferably about 125 g/m$^2$ or less, still more preferably about 115 g/m$^2$ or less, still more preferably about 110 g/m$^2$ or less, still more preferably about 105 g/m$^2$ or less, still more preferably about 100 g/m$^2$ or less, and most preferably about 95 g/m$^2$ or less, with most preferred areal density ranges of from about 15 g/m$^2$ to about 95 g/m$^2$ or from about 30 g/m$^2$ to about 95 g/m$^2$. In a particularly preferred embodiment, the outer fibrous material layer has an areal density of from about 200 g/m$^2$ to about 400 g/m$^2$ and the base layer has an areal density of from about 15 g/m$^2$ to about 110 g/m$^2$, more preferably from about 30 g/m$^2$ to about 110 g/m$^2$. In preferred embodiments, the sum of the outer fibrous material, base layer, optional backing layer and any additional optional layers or materials, produces a composite material having a total combined areal density of from about 60 g/m$^2$ to about 800 g/m$^2$, more preferably from about 100 g/m$^2$ to about 600 g/m$^2$, and most preferably from about 200 g/m$^2$ to about 500 g/m$^2$.

In this regard, it is most preferred that the outer fibrous material layer has an areal density of greater than 50% of the total combined areal density of the entire composite article, particularly in a composite including only two fibrous material layers. In one embodiment, the areal density of the outer fibrous material layer is greater than about 60% of the total combined areal density of all combined layers. In another embodiment, the areal density of the outer fibrous material layer is greater than about 70% of the total combined areal density of all combined layers. In most preferred embodiments, the outer fibrous material layer comprises from about 60% to about 75% of the total combined areal density of all the composite article layers combined and the base layer comprises from about 20% to about 30% of the total combined areal density of all the composite article sections, and the optional backing layer when present preferably comprises from about 5% to about 10% of the total combined areal density of all the composite article layers.

In view of the above, a material layer having greater areal density is not necessarily thicker than a material layer having lower areal density. In this regard, the thickness depends to a degree on the pressure applied when consolidating/molding the fibrous plies together and the degree to which fibers overlap in individual fiber plies. The thickness of each fibrous material section will generally correspond to the thickness of the individual fibers and the number of fiber plies/layers incorporated into the composite. A preferred woven fabric, knitted fabric or felted non-woven fabric will have a preferred thickness of from about 25 µm to about 600 µm per ply/layer, more preferably from about 50 µm to about 385 µm and most preferably from about 75 µm to about 255 µm per ply/layer. A preferred two-ply unidirectional non-woven fabric composite will have a preferred thickness of from about 12 µm to about 600 µm, more preferably from about 50 µm to about 385 µm and most preferably from about 75 µm to about 255 µm.

In an alternative embodiment of this disclosure, as an alternative to the colored polymeric material between said outer fibrous material layer and said base layer (referenced as an "interior colored polymeric material"), or in addition to the colored polymeric material between said outer fibrous material layer and said base layer, a colored polymeric contrast material having at least one color may be applied onto an outer surface of the fibrous base layer (i.e., the surface of the fibrous base layer that is not facing toward the colored outer fibrous material layer)(referenced as an "exterior colored polymeric material"). Such an external colored polymeric material is described in commonly-owned U.S. provisional application Ser. No. 62/446,509, which is incorporated by reference herein to the extent consistent herewith.

In this embodiment, the exterior colored polymeric material is as defined above for the interior colored polymeric material with identical properties and characteristics as described herein for said interior colored polymeric material. It may be a coating or a colored film, and it may be applied or coated onto the fibrous material surface using any of the methods described herein for the interior colored polymeric material. If both an interior and an exterior colored polymeric material are incorporated, they may be the same as each other or different, with each/both having a Munsell hue that is identical to, similar to, or at least analogous to the Munsell hue of at least one color of said colored outer fibrous material layer, with the colors being determined by ASTM D1535 and compared. The external colored polymeric material may serve various purposes in the composite construction, such as providing abrasion resistance and will also cover, camouflage or otherwise obscure the appearance of the fibrous base layer in the event that outermost surface of the fibrous base layer becomes exposed during regular use of an article comprising the multilayer composite of this disclosure, which may be susceptible to said composite forms or is incorporated within a plate carrier article designed in the form of the Safariland LLC Advanced Webless System, or the like, having holes cut through the full thickness of the entire composite as taught in U.S. Pat. No. 7,200,871 and as illustrated in FIG. 1. Often, the holes of said webless design sag due to the weight of the modular attachments, which may expose said outer, rear surface of the fibrous base layer, exposing it through the holes/perforations. The exterior colored polymeric material will conceal that rear surface by having a color that is camouflaged by the appearance of the outer fibrous material layer when it may otherwise have a color that is not camouflaged and easy to see. It is also within the scope of this disclosure that either of or each of said internal colored polymeric material and said external colored polymeric material may be colored black whether or not said black color has a Munsell hue that is identical to, similar to, or at least analogous to the Munsell hue of at least one color of said colored outer fibrous material layer. This embodiment, while not most preferred, would at least be effective in making the appearance of the fibrous base layer less apparent if exposed. It should also be understood that both the internal and external colored polymeric materials would be equally effective in serving their above stated purposes if the colored outer fibrous material layer were not perforated (had no intentionally made cut outs/holes) and was a conventional closed, woven or non-woven fabric, but wherein damage to the fabric results in an exposure of the fibrous base layer through said colored outer fibrous material layer.

The following examples serve to illustrate preferred embodiments of the disclosure:

EXAMPLE 1

A consolidated composite laminate is fabricated that comprises a single mil-spec Mil-DTL-32439 woven nylon fabric (500 denier nylon fibers) having a conventional U.S. Woodland camouflage pattern (four color, high contrast disruptive pattern with irregular markings in sand, brown, green and black), which mil-spec nylon fabric is adhered to a single woven polyethylene fabric (375 denier SPECTRA® 1000 fibers; plain weave construction; pick count of 32×32 ends/inch; areal density=0.82 lb/ft$^2$). The fabrics are attached to each other by lamination with an intermediate black adhesive polyethylene film having a Munsell hue that is identical to the black color found in the U.S. Woodland camouflage pattern.

EXAMPLE 2

Example 1 is repeated except an intermediate black adhesive polyurethane film is used instead of a black adhesive polyethylene film.

EXAMPLE 3

Example 1 is repeated except in addition to an intermediate black adhesive polyethylene film between the nylon fabric and the polyethylene fabric, an external black polyethylene film is also applied onto the outermost surface of the polyene fabric.

EXAMPLE 4

Example 2 is repeated except in addition to an intermediate black adhesive polyurethane film between the nylon fabric and the polyethylene fabric, an external black polyurethane film is also applied onto the outermost surface of the polyene fabric.

EXAMPLE 5

Example 1 is repeated except as an alternative to an intermediate black adhesive polyethylene film between the nylon fabric and the polyethylene fabric, an external black polyethylene film is applied onto the outermost surface of the polyene fabric.

EXAMPLE 6

Example 2 is repeated except as an alternative to an intermediate black adhesive polyurethane film between the nylon fabric and the polyethylene fabric, an external black polyurethane film is applied onto the outermost surface of the polyene fabric.

EXAMPLES 7-12

Each of Examples 1-6 is repeated except wherein the mil-spec Mil-DTL-32439 woven nylon fabric is perforated with a pattern of holes to have a design as described in U.S. Pat. No. 7,200,871 and as illustrated in FIG. 1.

While the present invention has been particularly shown and described with reference to preferred embodiments, it will be readily appreciated by those of ordinary skill in the art that various changes and modifications may be made without departing from the spirit and scope of the invention. It is intended that the claims be interpreted to cover the disclosed embodiment, those alternatives which have been discussed above and all equivalents thereto.

What is claimed is:

1. A multilayer composite comprising:
   a) a perforated, colored outer fibrous material layer, wherein perforations are cuts through said outer fibrous material layer and the outer fibrous material layer comprising one or more fibrous plies, wherein each of said fibrous plies comprises fibers having a tenacity of 10 g/denier or less; said outer fibrous material layer having at least one color;
   b) a fibrous base layer adjoined with the outer fibrous material layer, said fibrous base layer comprising one or more fibrous plies, each of said fibrous plies comprising fibers having a tenacity of greater than 10 g/denier; wherein the outer fibrous material layer has a different colored appearance than the fibrous base layer; and
   c) a colored polymeric material between said outer fibrous material layer and said fibrous base layer; said colored polymeric material having at least one color;
   wherein the colored polymeric material is on said fibrous base layer, and wherein each of said colored polymeric material and said fibrous base layer are positioned directly behind the perforations of the outer fibrous material layer, wherein said colored polymeric material is partially exposed through said perforations and wherein visual exposure of the fibrous base layer through said perforations is at least partially obscured by the colored polymeric material; and wherein the portions of the colored polymeric material exposed through said perforations are camouflaged by the outer fibrous material layer.

2. The composite of claim 1 wherein said colored polymeric material is a colored polymer film, and wherein the outer fibrous material layer has an areal density of from about 200 g/m² to about 400 g/m².

3. The composite of claim 1 wherein each color of the colored outer fibrous material has a Munsell hue, and each color of the colored polymeric material has a Munsell hue, wherein the colored polymeric material has a Munsell hue within ±5 steps on the Munsell hue scale as the Munsell hue of at least one of the colors of said outer fibrous material and wherein each of the fibrous plies of said fibrous base layer comprise fibers having a tenacity of greater than 20 g/denier.

4. The composite of claim 2 wherein each color of the colored outer fibrous material has a Munsell hue, and each color of the colored polymeric material has a Munsell hue, wherein the colored polymeric material has an identical Munsell hue as the Munsell hue of at least one of the colors of said outer fibrous material and wherein each of the fibrous plies of said fibrous base layer comprise fibers having a tenacity of greater than 20 g/denier.

5. The composite of claim 1 wherein said colored polymeric material comprises a polymeric matrix coating that is coated on and at least partially impregnates said fibrous base layer.

6. The composite of claim 1 wherein the fibrous base layer comprises one or more non-woven fibrous plies, which non-woven fibrous plies are consolidated, and wherein each fibrous ply comprises fibers coated with a polymeric binder.

7. The composite of claim 6 wherein said polymeric binder is said colored polymeric material.

8. The composite of claim 7 wherein said polymeric binder also adhesively attaches the outer fibrous material layer to the fibrous base layer.

9. The composite of claim 1 wherein the outer fibrous material layer comprises nylon fibers and the fibrous base layer comprises polyethylene fibers.

10. The composite of claim 1 wherein said fibrous base layer has an inside surface and an outside surface, wherein said inside surface faces the outer fibrous material layer, and wherein the composite further comprises a backing layer on said outside surface of the fibrous base layer.

11. The composite of claim 10 wherein the backing layer comprises one or more fibrous plies, each of said fibrous plies comprising fibers having a tenacity of greater than 10 g/denier.

12. The composite of claim 10 wherein the outer fibrous material layer comprises fibers having a tenacity of 10 g/denier or less and the backing layer comprises fibers having a tenacity of greater than 10 g/denier.

13. The composite of claim 12 wherein the outer fibrous material layer comprises nylon fibers, the fibrous base layer comprises polyethylene fibers, and the backing layer comprises polyethylene fibers.

14. The composite of claim 1 wherein said perforations comprise a pattern of shaped openings cut into and completely through the thickness of the outer fibrous material layer, wherein said perforations are attachment points for pouches or accessories to be held by said outer fibrous material layer.

15. The composite of claim 1 wherein said outer fibrous material layer is colored with a plurality of colors in a camouflage pattern; wherein said colored polymeric material is colored with one color, and wherein the color of the colored polymeric material is the same as one of the colors of said camouflage pattern.

16. A multilayer composite comprising two or more different fibrous material layers, said composite comprising:
   a) a perforated, colored outer fibrous material layer, said outer fibrous material layer comprising one or more woven fibrous plies; said outer fibrous material layer being colored with a camouflage pattern; and wherein said perforations comprise a pattern of shaped openings cut into and completely through the thickness outer fibrous material layer;
   b) a fibrous base layer adjoined with the outer fibrous material layer, said fibrous base layer comprising one or more non-woven fibrous plies, each of said fibrous plies comprising fibers having a tenacity of greater than 15 g/denier; wherein the outer fibrous material layer has a different colored appearance than the fibrous base layer; and c) a colored polymeric material between and attached to each of said outer fibrous material layer and said fibrous base layer; wherein each of said colored polymeric material and said fibrous base layer are positioned directly behind the perforations of the outer fibrous material layer; said colored polymeric material having one color, wherein the color of the colored polymeric material is the same as one of the colors of said camouflage pattern of the outer fibrous material layer wherein the colored polymeric material is partially exposed through said perforations and wherein visual exposure of the fibrous base layer through said perforations is at least partially obscured by the colored polymeric material; and wherein the portions of the colored polymeric material exposed through said perforations are camouflaged by the fibrous material layer.

17. A method of forming a multilayer composite that comprises two or more different fibrous material layers, said composite comprising:

a) providing a perforated, colored outer fibrous material layer, wherein perforations are cuts through said outer fibrous material layer and the outer fibrous material layer comprising one or more fibrous plies, and wherein each of said fibrous plies comprises fibers having a tenacity of 10 g/denier or less; said outer fibrous material layer having at least one color;

b) providing a colored polymeric material, wherein said colored polymeric material is colored with a color that matches at least one color of said outer fibrous material layer;

c) providing a fibrous base layer, said fibrous base layer comprising one or more fibrous plies, each of said fibrous plies comprising fibers having a tenacity of greater than 20 g/denier; wherein the outer fibrous material layer has a different colored appearance than the fibrous base layer; and d) attaching the fibrous base layer to the outer fibrous material layer coextensively wherein at least a portion of the colored polymeric material is positioned between the fibrous base layer and the outer fibrous material layer, wherein a portion of the colored polymeric material is positioned directly behind each of the perforations in said fibrous material layer;

wherein the colored polymeric material is partially exposed through said perforations and wherein visual exposure of the fibrous base layer through said perforations is at least partially obscured by the colored polymeric material; and wherein the portions of the colored polymeric material exposed through said perforations are camouflaged by the fibrous material layer.

18. The composite of claim 16 which further comprises a backing layer on said fibrous base layer, wherein the backing layer comprises one or more fibrous plies, each of said fibrous plies comprising polyethylene fibers having a tenacity of at least about 27 g/denier, wherein each of the woven fibrous plies of said outer fibrous material layer comprise nylon fibers and wherein each of the non-woven fibrous plies of said fibrous base layer comprise polyethylene fibers, and wherein said perforations comprise a pattern of shaped openings cut into and completely through the thickness of the outer fibrous material layer.

19. The composite of claim 1 wherein the fibers of said outer fibrous material layer consist essentially of fibers having a tenacity of 10 g/denier or less and wherein the fibers of said fibrous base layer consist essentially of fibers having a tenacity of at least about 27 g/denier.

20. The composite of claim 1 wherein the fibers of said outer fibrous material layer consist of nylon fibers and wherein the fibers of said fibrous base layer consist of polyethylene fibers.

* * * * *